Feb. 20, 1940. K. E. LAUTERBACH 2,191,348
DUST MOP HANDLE OR THE LIKE
Filed Jan. 11, 1939 2 Sheets-Sheet 1
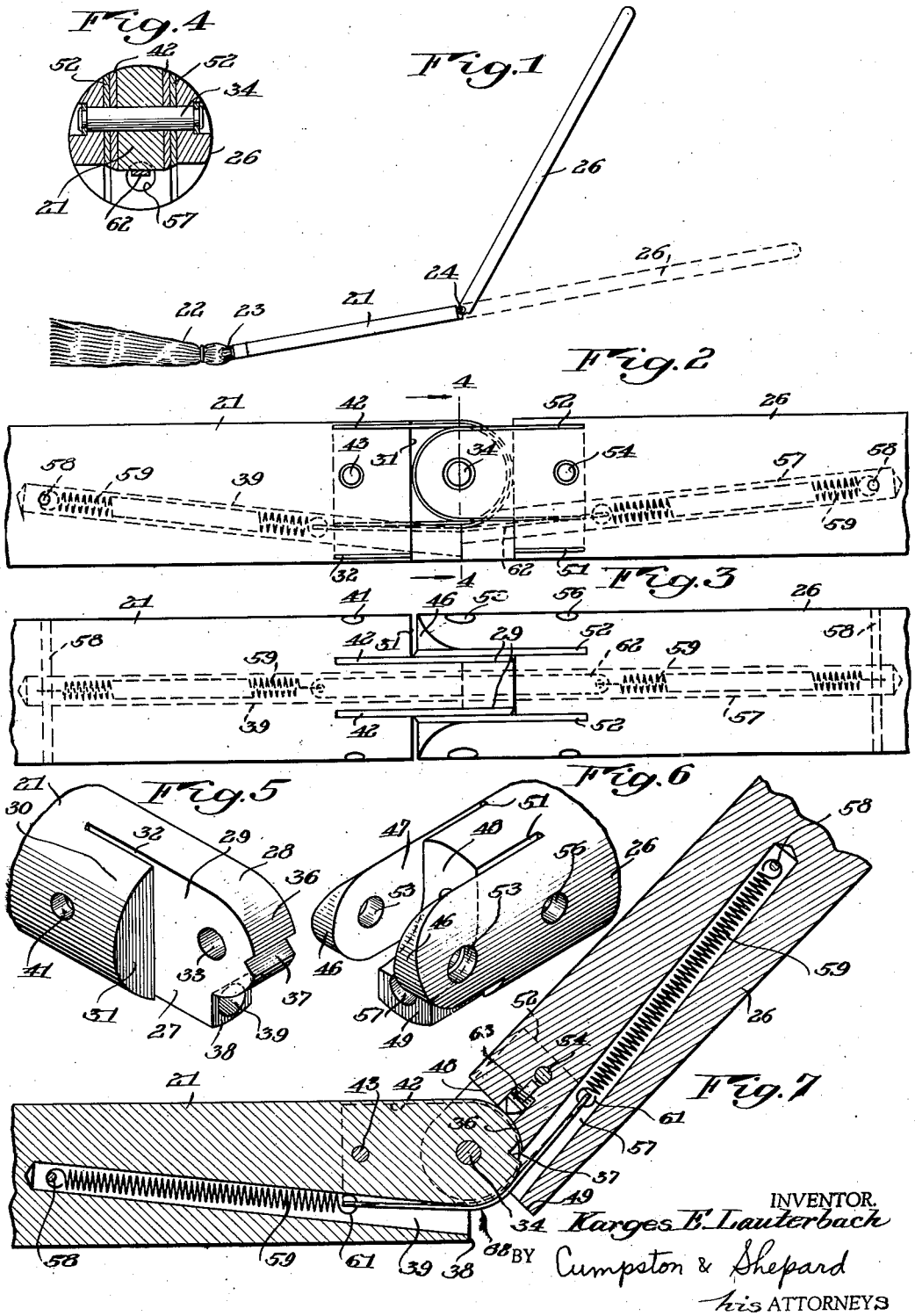

Feb. 20, 1940.  K. E. LAUTERBACH  2,191,348
DUST MOP HANDLE OR THE LIKE
Filed Jan. 11, 1939  2 Sheets-Sheet 2

INVENTOR.
Karges E. Lauterbach
BY Cumpston & Shepard
his ATTORNEYS

Patented Feb. 20, 1940

2,191,348

UNITED STATES PATENT OFFICE 2,191,348

DUST MOP HANDLE OR THE LIKE

Karges E. Lauterbach, Irondequoit, N. Y.

Application January 11, 1939, Serial No. 250,385

5 Claims. (Cl. 287—86)

My invention relates to handles for dust mops, brooms or the like.

An object of my invention is to provide a simple and inexpensive handle construction for a dust mop or the like wherein the handle is in two sections adapted to be pivoted with respect to each other to enable the convenient cleaning or sweeping beneath objects such as beds, bureaus, tables, or chairs without bending the body.

Another object of my invention is to provide a two section handle for a dust mop, broom or the like wherein the two handle sections are pivoted with respect to each other and provided with means normally acting to draw the two sections of the handle into line, said means being entirely enclosed within the handle whereby the exterior of the handle is smooth and uninterrupted so as not to cause injury to the hands or to articles of furniture with which the handle may come in contact.

More specifically, my invention contemplates a two section handle for a mop, broom or the like wherein the sections are pivoted with respect to each other, are provided with means for preventing the pivotal movement of the sections except on the application of an appreciable handle bending force, and are provided with means normally acting to draw the two sections into line, the handle being so constructed and arranged that all the operating parts are located within the confines of the handle surface so that the handle presents a smooth exterior unlikely to scratch or nick articles of furniture with which the handle may come in contact.

Other objects and advantages of my invention will be apparent from the following description when taken in connection with the accompanying drawings, in which:

Fig. 1 is a side view of a mop to which the novel handle construction of my invention is applied, showing in dotted lines the normal position of the handle and showing in solid lines the position to which one section of the handle may be pivoted to enable the effective use of the mop beneath objects without bending;

Fig. 2 is an enlarged side view of the handle joint showing, in dotted lines, the springs for normally restoring the handle sections to a straight line position;

Fig. 3 is a top view of Fig. 2;

Fig. 4 is a view taken on the line 4—4 of Fig. 2 in the direction indicated by the arrows;

Fig. 5 is a perspective view of the end of one of the handle sections;

Fig. 6 is a perspective view of the end of the other handle section;

Fig. 7 is a sectional view through the joint of the handle;

Fig. 8 is a side elevation of the handle joint of a modified form of my invention;

Fig. 9 is a top view of Fig. 8, with parts in dotted lines to show the interior of the joint;

Fig. 10 is a sectional view through the handle joint;

Fig. 11 is a sectional view taken on the line 11—11 of Fig. 10 in the direction indicated by the arrows;

Fig. 12 is a view taken on the line 12—12 of Fig. 10 in the direction indicated by the arrows;

Fig. 13 is a view showing the end of one of the handle sections;

Fig. 14 is a view similar to Fig. 10 with the handle sections pivoted with respect to each other.

The same reference numerals throughout the several views indicate the same parts.

The handle of my invention may be applied to any type of appliance such as a broom, dust mop or vacuum cleaner. For purposes of illustration, I have shown my invention as applied to a mop, but it will be appreciated that the invention is of general application.

The handle comprises a part or section 21 to which the mop 22 is secured, as shown at 23, in any conventional manner. Pivoted to the handle section 21 by means generally indicated at 24 is a second handle section 26. Through the pivotal relationship of the handle sections 21 and 26, when desired the handle section 26 may be moved from the dotted line position shown in Fig. 1 to the solid line position to enable the mop to be extended under a bed, bureau, table, chair or other article to enable convenient cleaning beneath the object without the housewife stooping or bending her body.

The end of the section 21 of the handle has a pair of side cut-out portions 27 (Fig. 5) on opposite sides of a plane extending longitudinally of the handle to provide an intermediate section 28 which has plane parallel surfaces 29 on opposite sides thereof. The cut-outs also form surfaces 31 which are perpendicular to the plane of the surfaces 29. Cut in the plane of the surfaces 29 and extending beyond the surfaces 31 are a pair of longitudinally extending parallel slots 32 which define parts 30 and are for the reception of a pair of metal fixtures, as will be presently described. Extending between the plane surfaces 29 is a bore 33 for the reception of a pivot pin 34 which retains the sections of the handle together and upon which the two sections are pivoted.

The intermediate section 28 has a rounded end 36 formed substantially on the arc of a circle of which the axis of the bore 33 is the center. Cut in the periphery of the rounded end 36 of the intermediate section 28 is a preferably V-shaped notch 37. Below the rounded end 36 an abutment 38 is formed from which a bore 39 extends longitudinally of the handle section. The bore 39, as shown in Fig. 2, preferably extends at an angle to the axis of the handle section 21. A bore 41 spaced from the bore 33 extends through the parts 38 and the intermediate section 28. Apertures formed in two metal plates 42, on each side of the intermediate section, register with the bore 33. The plates lie in the slots 32 and extend along the plane surfaces 29 and are held in position by a bolt or rivet 43 extending through the bore 41 and through the apertures in the plates. Preferably the two ends of the bore 41 are slightly countersunk so that the ends of the rivet lie below the outer surface of the handle, as illustrated for example in Fig. 11. The plates 42 extend parallel to the plane surfaces 29 are clamped in position by the rivet 43 and are provided with apertures in alignment with the bore 33.

The end of the section 26 has a U-shaped cutout forming arms 46 and parallel plane surfaces 47 spaced apart somewhat more than the width of the intermediate section 28. A curved surface 48 complementary to the rounded end 36 of the handle section 21 and an abutment 49 complementary to the abutment 38 are also formed in the end of the handle section 26. Longitudinally extending slots 51 lying substantially in the plane of the surfaces 47 are provided for the reception of metal plates 52. The parts are proportioned and arranged so that when the two sections of the handle are assembled to form what may be termed a dovetailed joint, the plates 52 lie outside of the plates 42. Through the U-portions 46 at the end of the section 26 is a bore 53 which registers with apertures formed in the plates 52 for the reception of the pivot pin. The outer portions of the bore 43 are slightly countersunk so that when the pivot pin 34 is in position, the ends of the pivot pin are recessed within the outer wall of the handle. The pivot pin extends through the sections 46, the intermediate section 28 of the handle section 21 and through the plates 42 and 52. The plates 52 are held in position by a rivet 54 which lies in a countersunk bore 56 formed in the handle section 26 and which extends through apertures formed in the plates 52.

While I prefer to use the metal plates 42 and 52 for the purpose of making the joint long wearing, it will be appreciated that the joint could be made without any metal parts. It will further be appreciated that the ends of the sections could be shaped so as to receive the plates on the outer surfaces of the ends of the sections. The plates would then be curved to conform to the shape of the handle sections. The metal plates would be unlikely to injure the furniture as they would not extend over the uppermost surface of the handle when in operating position which is the portion of the handle most likely to strike the furniture.

Extending inwardly longitudinally of the handle section 26 from the abutment 49 is a bore 57 which preferably extends at a slight angle to the axis of the handle section 26. Secured in the ends of the bores 39 and 57 are pins 58, which form anchors for springs 59. The other ends of the springs 59 are secured, as shown at 61, to a flexible metal band 62 which connects the springs together. While I have shown a spring in each of the handle sections 21 and 26, it will be apparent that one of the springs might be omitted. For example one end of the flexible band might be connected to a spring in one handle section and the opposite end of the flexible band connected directly to the other handle section. Mounted in a bore in the curved portion 48 of the U-shaped end of the section 26 is a spring-pressed detent 63 the end of which normally lies in the U-shaped notch 37 so as to retain the handle sections 21 and 26 in line with each other or in the position shown in dotted lines in Fig. 1.

When the person using the mop desires to reach beneath a bed, table, chair or other obstruction, upon exerting an appreciable bending action at the pivot point 24, the handle will "break" and the handle section 26 may be moved with respect to the handle section 21 to the position shown in solid lines in Fig. 1. This movement is accomplished against the action of the springs 59 which are expanded during the movement of the handle section 26 from the dotted line position shown in Fig. 1 to the solid line position shown in that figure. When the dusting operation beneath the bed, chair or table has been completed, the housewife may release the manual pressure causing the handle sections 21 and 26 to be retained in the solid line position shown in Fig. 1, after which the springs 59 will restore the handle sections to their "in line" position. When the handle sections are in line the detent 63 is spring pressed into the V-shaped notch 37. The mop, when in the dotted line position shown in Fig. 1, functions in the manner of a straight solid-handle mop. The handle sections are not moved to an angular position with respect to each other under the ordinary conditions of using the mop. The handle sections are bent with respect to each other only when the housewife desires this to occur and exerts a definite and appreciable bending force at the pivot point 24 so as to "break" the handle.

In Figs. 8–14, inclusive, I have shown a modification of my invention wherein the end of the handle section 21 is concave as shown at 71 and the end of the handle section 26 is formed with a complementary convex surface 72. The end of each of the sections 21 and 26 is provided with a longitudinally extending bore 73. Extending crosswise of the end of the handle section 21 are a pair of bores 74 for the reception of pins or rivets 76. The bores 74 are preferably countersunk below the surface as shown in Figs. 9 and 11 so that the outer surface of the handle section is smooth and uninterrupted. The pins 76 serve as a support for a pair of plates 77 which are apertured to receive the pins and mounted in the bore 73. The plates 77 are separated by a pair of spacers 78 mounted on the pins. The rearward ends of the plates 77 have their lower portions bent and curved upward, as shown at 79 (Fig. 11), to form a pair of rails 80 for a purpose later to be described. The upper edges of each of the rails 80 of the plates 77 are provided each with a notch 81. At their ends the plates 77 are provided with a cutout portion forming in each of the plates a pair of stops 80a.

Formed in the end of the handle section 26 and extending crosswise thereof are a pair of bores 82 for the reception of pins 83, the ends of which are recessed below the surface of the handle by countersinking the bores. Separated by spacing members mounted on the pins 83 are a pair of plates 84 which are connected together at their outer ends by a bridging part 86 (Fig. 12). The ends of the plates 77 and 84 are apertured as shown in Fig. 12 and are pivoted relative to each other by means of a pivot pin 87. A leaf spring 88 mounted on the rearward pin 82 extends between the plates 84, beneath the bridging part 86 and has its end extending into the bore 73 of the handle section 21. The end of the spring is T-shaped as shown at 91, the arms of the T being adapted to ride on the rails 80 of the plates 77. The end of the handle section 26 has a notch 92 cut therefrom to accommodate the plates 77 when the handle parts are moved from the relative position shown in Fig. 10 to that shown in Fig. 14.

When the parts are in their normal position with the handle sections 21 and 26 in line, the mop functions in the ordinary manner. In this position of the parts the T-shaped end 91 of the spring 88 lies in the notches 81 so that an appreciable force is required to "break" the handle sections with respect to each other. When, however, this is accomplished, the sections may be easily moved to the position shown in Fig. 14 or any intermediate position under the restraining influence of the spring 88. When the housewife has finished dusting beneath a table or other article of furniture, the manual force tending to hold the handle sections in angular position with respect to each other is released and the force of the spring tends to bring the handle sections in line so that the T-shaped end of the leaf spring locks in the notches 81. The mop may then be used in the normal manner. The stops 80a in cooperation with the bridging part 86 serve to limit the movement of the handle sections with respect to each other both when moving the handle sections to their angular relationship and when moving them to their straight line position.

While I have shown in this second form of my invention a leaf spring, it will be appreciated that the type of springs shown in the first form of my invention may be used in place of a leaf spring. Insofar as the ease with which the handle sections may be cut and the parts assembled is concerned, I prefer the second form of my invention. The ends of the handle sections may be more easily cut in this form of the invention, since it is merely necessary to form the convex and concave mating surfaces 71 and 72, the bores 73 and the notch 92 in the end of one of the handle sections. Moreover, the metal parts may be assembled in pivotal relation, slipped into the bores at the ends of the handle sections, and the pins inserted in place with the rearward pin 82 carrying the spring 88.

One of the advantages of my invention is that the parts are all located within the handle sections, so that the outer surface of the handle is smooth and uninterrupted and has the appearance of a standard, conventional broom or dust mop handle. This is advantageous for the reason that obstructions or ridges formed by parts on the outer surface of the handle are likely to cause abrasions on the hands of the person using the broom, and are likely to scratch or chip furniture against which they are bumped.

In both forms of my invention I have shown and described the joint of the handle as being formed by cutting and shaping the wooden ends of the sections to receive the hinge and other parts of the joint. It will however be appreciated that, if desired, to the end of each wooden section may be fitted a tubular metal part conforming in diameter to that of the handle, for receiving the operating parts of the joint.

While I have shown preferred forms of my invention, it will be apparent that various changes and modifications may be made, particularly in the form and relation of parts without departing from the spirit of my invention as set forth in the appended claims.

I claim:

1. A device of the character described comprising a two section handle the end of one of said sections being concave and the end of the other section being convex, each section having a longitudinal bore adjacent the meeting ends of the handle sections, a metal part secured in each of said bores, a pivot between said metal parts for enabling pivotal movement of the handle sections with respect to each other, a spring in the hollow bore of one of said sections secured to the other section and normally acting to draw the sections into line, and means for normally restraining the sections from pivotal movement except on the application of an appreciable bending force on the handle.

2. A handle for mops, brooms, and the like comprising two handle sections, a pivotal connection between said two sections permitting them to swing relatively to each other in one plane and holding them against deflection relatively to each other out of said plane, cooperating abutment parts on said two sections to limit swinging movement in one direction to a substantially straight-line position, and spring means tending to hold said two sections in said straight-line position, said spring means being sufficiently resilient to permit said two sections to be swung to an angle with respect to each other by application of external force, said pivoted connection and said spring means being substantially entirely within the external outline of the handle in its straight-line position so as to provide a substantially smooth exterior surface substantially free from projections likely to hit and mar furniture.

3. A handle for mops, brooms, and the like comprising two handle sections, a pair of metal plates spaced laterally from each other and arranged approximately parallel to each other and set into and fastened to one of said sections, another pair of metal plates spaced laterally from and substantially parallel to each other and set into and fastened to the other of said handle sections, the two plates set into one section respectively overlapping the two plates set into the other section, pivot pin means connecting the respectively overlapping plates to each other so that said plates and said pivot pin means constitute a hinge connection between said two handle sections permitting said sections to swing relatively to each other in one plane and holding them against deflection relatively to each other out of said plane, cooperating abutment parts limiting swinging movement of said two handle sections in one direction to a substantially straight-line position, and spring means tending to hold said two sections in said straight-line position, said spring means being sufficiently resilient to permit said two sections to be swung to an angle with respect to each other by application of external force, and being substantially entirely within the general external outline of the handle in its straight-line position so as to provide an approximately smooth external surface of said handle, substantially free from projections likely to hit and mar furniture.

4. A handle for mops, brooms, and the like comprising two handle sections, a pair of metal plates spaced laterally from each other and arranged approximately parallel to each other and set into and fastened to one of said sections, another pair of metal plates spaced laterally from and substantially parallel to each other and set into and fastened to the other of said handle sections, the two plates set into one section respectively overlapping the two plates set into the other section, pivot pin means connecting the respectively overlapping plates to each other so that said plates and said pivot pin means constitute a hinge connection between said two handle sections permitting said sections to swing relatively to each other in one plane and holding them against deflection relatively to each other out of said plane, cooperating abutment parts limiting swinging movement of said two handle sections in one direction to a substantially straight-line position, a bore extending in a generally longitudinal direction within each handle section, and connecting means extending through the bores in both sections and anchored therein and passing the pivotal axis of said hinge connection at a point offset from said pivotal axis, said connecting means including a coiled tension spring arranged at least partially in one of said bores for resiliently tending to restore said two handle sections to said straight-line position when said handle sections have been bent at an angle with respect to each other by application of external force.

5. A construction as described in claim 3, further comprising resilient detent means tending to latch said two handle sections in said straight-line position with respect to each other.

KARGES E. LAUTERBACH.